Oct. 29, 1963 S. R. RICH 3,108,820
MOBILE GARAGE
Filed Jan. 4, 1961 3 Sheets-Sheet 1
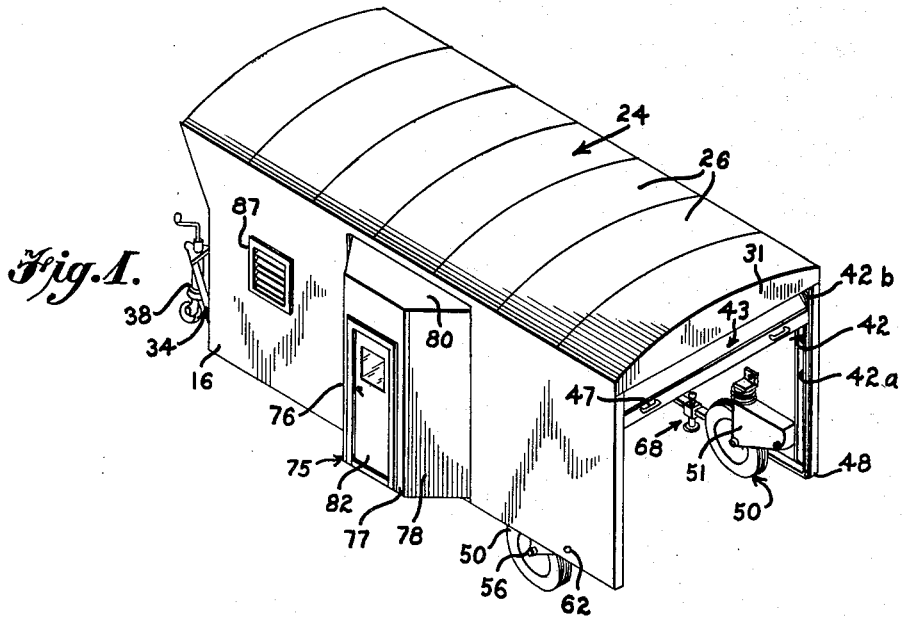
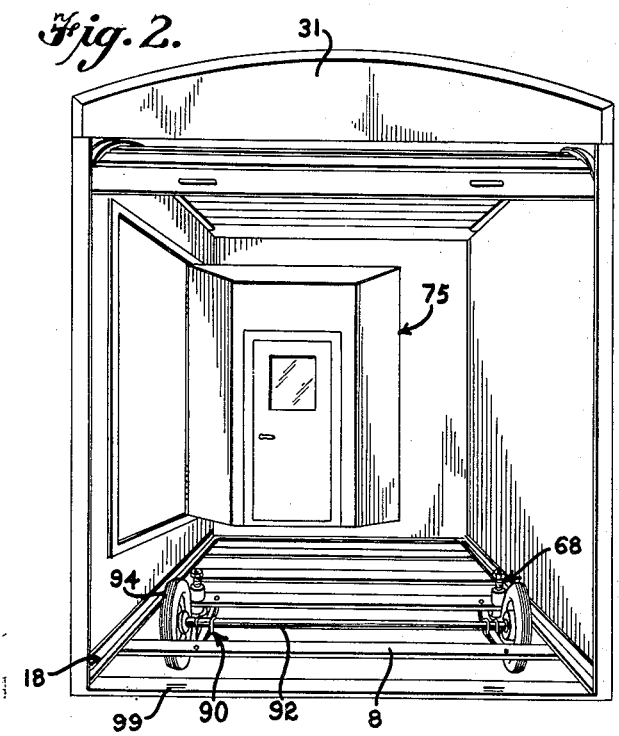
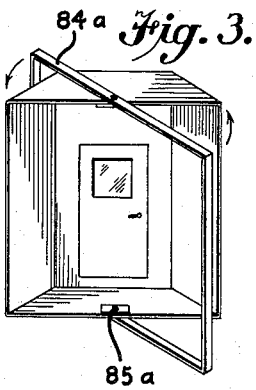
INVENTOR
Scott Rayfield Rich
BY Shoemaker and Mattare
ATTORNEYS Oct. 29, 1963 S. R. RICH 3,108,820
MOBILE GARAGE
Filed Jan. 4, 1961 3 Sheets-Sheet 2
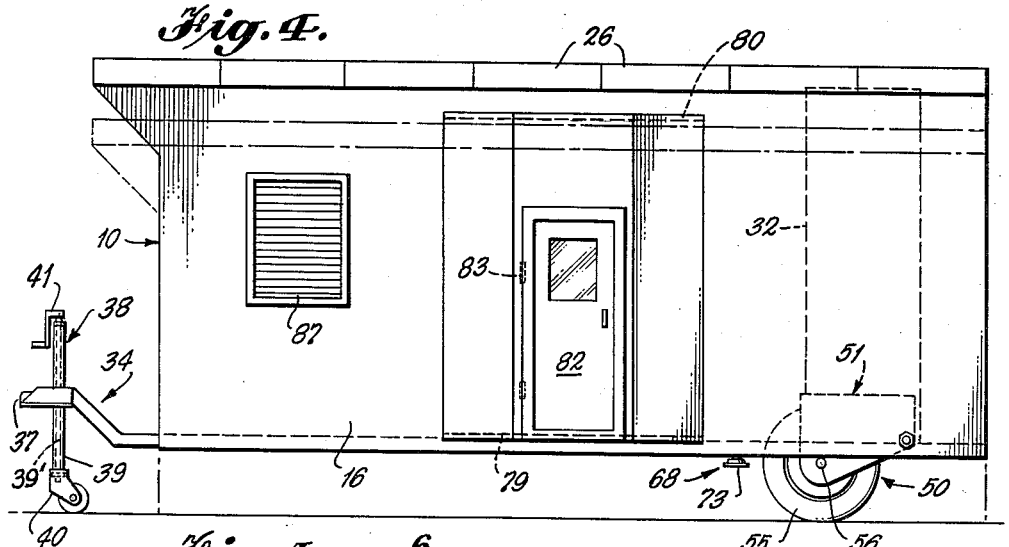
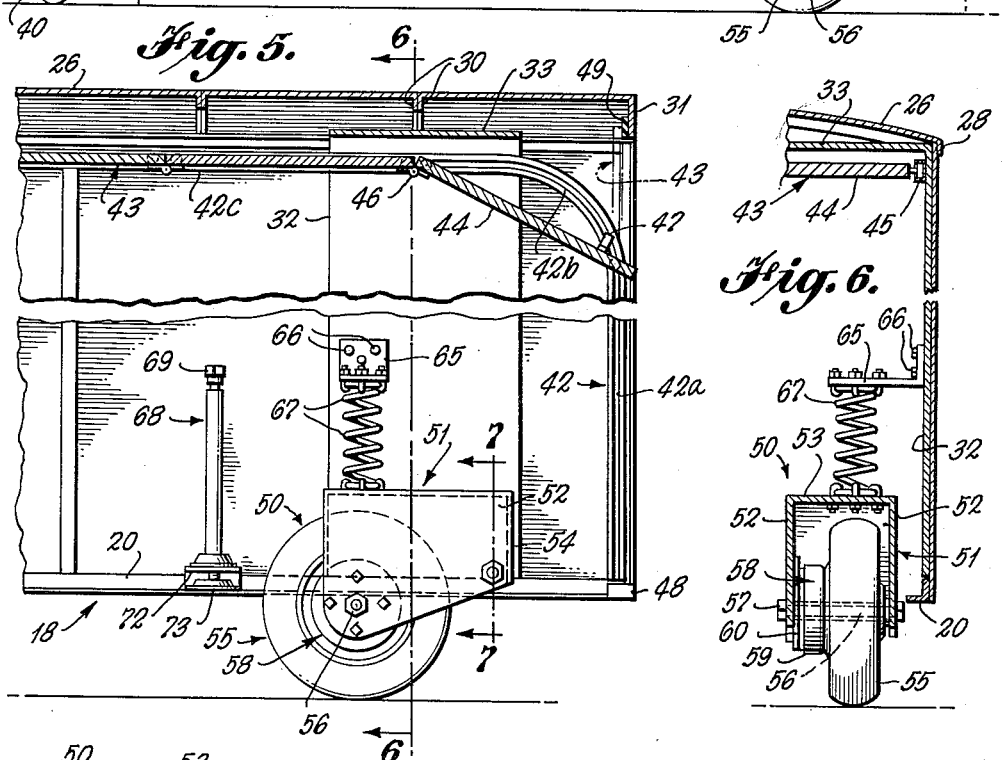
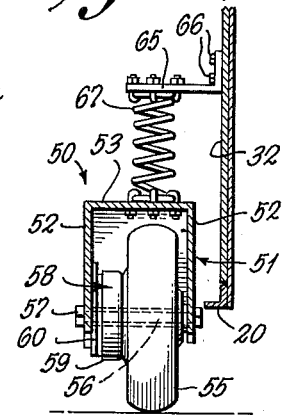
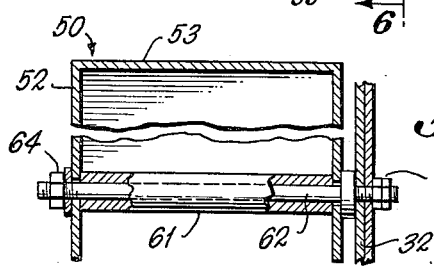
INVENTOR.
Scott Rayfield Rich
BY
Shoemaker and Mattare
ATTORNEYS

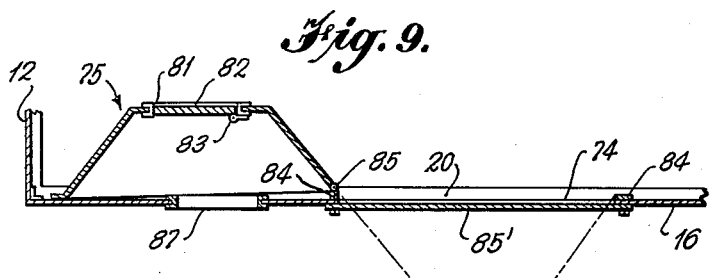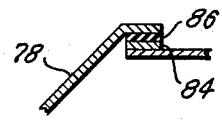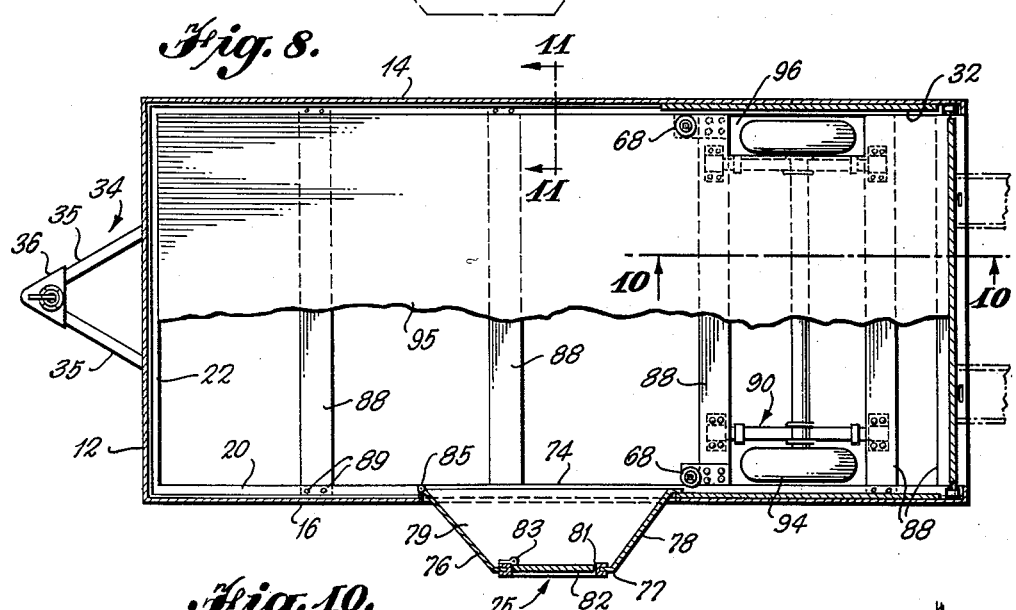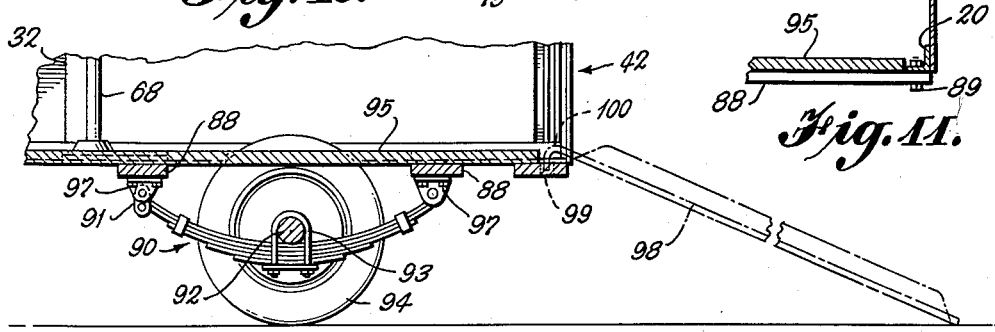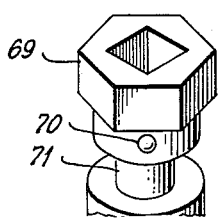

United States Patent Office 3,108,820
Patented Oct. 29, 1963

3,108,820
MOBILE GARAGE
Scott Rayfield Rich, Carmichaels, Pa.
Filed Jan. 4, 1961, Ser. No. 80,966
3 Claims. (Cl. 280—63)

This invention relates to the class of wheeled vehicles and is directed particularly to a mobile garage structure.

The present application constitutes a continuation in part of my prior application Serial No. 8,956 for Mobile Garage, filed February 16, 1960, and now abandoned.

The desirability of having a garage available for a motor vehicle is often felt by motorists when on motor trips so that when the motorist wishes to stop over for a considerable period of time in any one place his car can be suitable housed and protected from the elements. Often times on motor trips it is found that no shelter is available for the motor vehicle and as a consequence the latter must be left to stand out and be exposed to the elements.

It is a particular object, in view of the foregoing, to provide a novel mobile garage structure which may be coupled with a motor vehicle in the nature of a trailer to go along with the vehicle and thus be available for use to house the vehicle if and when necessary.

It is another object of the present invention to provide a mobile garage structure wherein means is provided to facilitate the lowering of the structure from a wheel supported elevated condition to a ground supported position so that the motor vehicle may be run into the garage and be fully protected.

Another object of the invention is to provide a mobile garage structure wherein one wall of the structure is provided with a pivotally supported vestibule unit which, when in use, projects outwardly from the side wall upon which it is mounted and provides available space to permit an occupant of a vehicle within the garage structure to open the vehicle doors so as to pass out of and into the vehicle and the garage unit and wherein such vestibule unit is fully movable into the garage structure when the latter is to be transported so that it will not form an obstruction which would interfere with the passage of the garage structure through narrow passageways.

A still further object of the invention is to provide a mobile garage structure of the above described character having quickly or readily removable rear supporting wheels together with jacking means which facilitates the removal of the wheels and the subsequent lowering of the structure onto the ground surface so that the garage structure may be employed as a permanent building or house either to enclose a motor vehicle or for use as living quarters.

The invention has for a further object to provide a mobile house or garage structure as above set forth designed in one embodiment to be used as a floorless structure when lowered onto the ground and in another embodiment having floor joists upon which a temporary floor may be laid so that the structure can be used as living quarters or a vehicle may be transported in the mobile structure.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in perspective of the complete mobile garage of the present invention, illustrating one embodiment thereof in which the rear wheels are individually slung in pivoted and removable housings.

FIG. 2 is a rear end perspective of the garage structure in which another form of wheel suspension is illustrated and showing joists or beams upon which flooring may be placed.

FIG. 3 is a fragmentary detail illustrating a center pivot mounting for the vestibule and door unit.

FIG. 4 is a view in side elevation of the structure shown in FIG. 1 and showing in more detail the front end jack support and hitch and illustrating in broken lines the structure when lowered to the ground.

FIG. 5 is a sectional view taken in a vertical longitudinal plane through the rear of the structure shown in FIGS. 1 and 4.

FIG. 6 is a sectional view taken substantially on the line 6—6 of FIG. 5.

FIG. 7 is a sectional detail taken substantially on the line 7—7 of FIG. 5.

FIG. 8 is a horizontal section taken through the modified structure shown in FIG. 2 and illustrating the flooring partly broken away to show underlying details.

FIG. 9 is a sectional view corresponding to a portion of the structure shown in FIG. 8 and illustrating the vestibule unit in operative position.

FIG. 10 is a sectional view taken substantially on the line 10—10 of FIG. 8.

FIG. 11 is a detail section taken substantially on the line 11—11 of FIG. 8.

FIG. 12 is a fragmentary detail in section showing the sill between the edge portion of the vestibule unit and the frame for the wall opening into which the vestibule unit is positioned for use.

FIG. 13 is a detail view illustrating the construction of the top end of an inside jack structure designed to be operated by a socket wrench.

Referring now more particularly to the drawings, the description of the invention will first be directed to the construction embodying the independently slung rear wheels as shown particularly in FIGS. 1 to 7.

The construction illustrated in FIGS. 9 to 12 is in the major part thereof the same as that shown in FIGS. 1 to 7 and where the parts are the same the same reference characters will be employed. The construction shown in FIGS. 8 to 11 embodies another form of wheel suspension and illustrates flooring and supporting means therefor. The mobile garage structure is generally designated 10 and comprises the front wall 12 and the side walls 14 and 16. These walls, which may be of any suitable material but preferably a lightweight metal such as aluminum, are mounted upon and secured to a heavy sill frame which is generally designated 18 and which comprises the longitudinal side portions 20 and the transversely extending front portion 22. The sill frame is welded or otherwise suitably secured to the bottom edges of the front and side walls and in the second form or embodiment of the invention the rear ends of the sill frames may be coupled together by a transverse floor beam or joist in the manner hereinafter described.

The top or roof of the structure is generally designated 24 and is also preferably formed of aluminum or any other suitable material and preferably the roof is formed of a number of transverse arcuate sections 26 suitably flanged at their ends as indicated at 28 to overlap the top edges of the side walls as particularly illustrated in FIG. 6. Also, the roof sections 26 have the longitudinal edge flanges which extend transversely of the structure and are designated 30 and these flanges of the sections are in abutted relation and suitably secured together by bolting, riveting or welding as may be found most desirable.

The rearmost one of the roof sections is formed integral with a depending apron 31 which has a straight bottom edge and extends transversely of the structure between the side walls as illustrated in FIGS. 1 and 5.

In order to strengthen and rigidify the structure there is disposed against the inner side of each side wall, adjacent to the rear end thereof the heavy rigid metal panel 32 which is secured along its bottom edge to the underlying longitudinal sill portion 20 and the top ends of these panels are connected transversely of the structure and in close adjacency to the underside of the roof by the cross panel 33.

The transverse sill portion 22 has rigidly secured thereto the forwardly extending hitch frame generally designated 34 which in the form here illustrated is comprised of two forwardly convergent arms 35 joined together at their outer or forward ends by the plate 36 which is formed in part to provide a conventional downwardly opening socket 37 for engagement with the ball of a conventional hitch structure secured to the rear of a towing vehicle.

Also forming a part of the hitch is a jack structure which is generally designated 38. The jack is of conventional design, comprising a vertical sleeve or tube 39 having extended therethrough a screw member 39', which is connected at its lower end to a caster wheel 40 and with the upper end of which is connected a crank 41 by which the screw is rotated to effect desired downward extension of the caster wheel when it is desired to elevate the front end of the garage structure.

The rear of the garage structure is open as illustrated in FIG. 1 and means is provided for closing this rear opening which includes trackways generally designated 42, located on the inner sides of the side walls and each of which trackways comprises the vertical portion 42a lying along the rear vertical edge of the adjacent wall, the upwardly and forwardly curving upper end portion 42b and the substantially horizontally disposed forwardly extending top portion 42c.

A sectional sliding door structure forming part of the closure means with the tracks, is generally designated 43 and embodies the hingedly coupled sections or panels 44 carrying roller means 45 at their opposite side edges for engagement in the adjacent trackways. The hinges coupling the panels 44 are here designated 46 and it will be readily apparent upon reference to FIG. 5 that the door structure 43 functions in the well known manner of sliding garage doors that by pulling upon the handle 47 which is carried by the lowermost one of the panels the several panels will move rearwardly and downwardly to dispose themselves in a vertical plane in the door opening as indicated in dotted outline in FIG. 5.

While no means has here been illustrated for giving assistance to the operation of opening the door, it will be understood that a door structure such as that here shown is also conventional and employs spring means, which is placed under tension when the door is moved to closed position and assists in retracting the door to its open position.

The numeral 48 designates a stop or bumper at the lower end of the track portion 42a against which the bottom of the lowermost door panel engages when the door is shut.

In order to establish an effective seal between the top of the door and the vertical roof panel 31, when the door is closed, a sealing strip 49 is positioned against the inner side of the panel 31 as shown in FIG. 5, against which the outer surface of the topmost panel 44 bears when the door is closed.

In the construction illustrated in FIGS. 1 and 4 to 7, the rear portion of the garage structure is shown supported upon independently sprung wheel supporting units. Each of these wheel units is generally designated 50 and each unit comprises a wheel housing which is generally designated 51 and which housing embodies the vertical side wall plates 52 which are joined together at their top edges by the horizontal top wall 53 while the rear portions of the side wall plates 52 are connected together by the vertical back wall 54. Thus, each wheel housing is open on its underside and has the forward side open to receive a pneumatic tired wheel 55.

The side walls 52 of the wheel housing support between them the wheel axle 56, the opposite ends of the axle extending through the side walls 52 and the axle is secured against movement by nuts 57 on the ends thereof and bearing against the outer sides of the walls 52.

Each of the wheel units also includes a suitable brake structure which is here generally designated 58. This brake structure may be of any suitable type, it being here illustrated as of the magnetic type, such, for example, as that which is commercially available under the trade name "Warner" and manufactured by the Warner Electric Brake and Clutch Company of Beloit, Wisconsin. Examples of such magnetic type brakes which would be suitable for use in the present structure are to be found in Patents Nos. 2,395,905 and 2,507,573. However, while a specific type of electric brake is herein named, it is to be understood that the invention is not to be limited to the use of this specific make of brake and neither is it limited to the use of an electric brake since a pneumatic or fluid operated brake may be employed if desired. In the brake structure shown in FIG. 5, considering the same as an electric brake, the numeral 59 may designate the brake drum which is secured to the wheel while the numeral 60 may designate the backing plate which carries the brake band, magnet and armature.

Rearwardly of the wheel the side walls of the wheel housing 50 have fixed therebetween a bearing sleeve 61 and extending through this sleeve is a supporting shaft 62 which passes through the side walls 52 of the wheel housing and one end of the shaft is extended through the adjacent wall plate 32 and side wall of the garage structure as shown in FIG. 7, to receive the securing nuts 63. The inner end of the shaft 62 carries the nut 64 which bears against the adjacent wall 52. Thus, the wheel housing 50 is supported on the shaft 62 for movement in a vertical plane and the wheel also moves with the housing as will be readily understood.

Disposed above the forward portion of the top wall 53 of the wheel housing is a heavy rigid bracket 65 secured as indicated at 66 in FIG. 6, to the adjacent vertical wall plate 32 and interposed between this bracket 65 and the top wall 53 of the wheel housing is a coil spring 67 of suitable weight for the purpose of supporting the garage structure.

Positioned forwardly of each supporting wheel unit 50 is a jack structure which is generally designated 68. This jack structure is generally of the same type as the forward jack structure 38 but the crank handle shown at 41 on the forward jack structure is replaced, for the reason hereinafter described, by the upwardly opening socket wrench receiving nut 69 which is shown in FIG. 13 and which is secured by a pin or screw 70 to the top end of the operating shaft 71 of the jack. This jack 68, mounted upon the inner side of each side wall of the garage structure is supported on a suitable plate 72 or other means, upon the side sill beam 20. The lower end of the extensible portion of the jack 68 is provided with a suitable base or foot 73 to bear or rest upon the ground when the jack is operated for elevating the adjacent rear corner of the garage structure.

The mounting of each of the jacks 68 upon the sill 20 places the body of the jack in close proximity to the side wall of the garage structure and therefore the use of a crank such as that shown at 41 on the jack 38 is not feasible but by replacing the crank with the socket wrench nut 69, as shown in FIG. 13, a suitable socket wrench may be conveniently employed for actuating the jack.

One side wall of the garage structure, here shown as the wall 16, is provided with a relatively large opening 74. Designed to be positioned in this opening is a vestibule unit which is generally designated 75 and this unit when disposed in the opening 74 extends beyond the outer side of the wall 16 as shown in FIG. 8.

The vestibule unit 75 when in operative position forms an outwardly bowed entrance structure and in the form here illustrated it comprises three vertical wall sections 76, 77 and 78, joined at their top and bottom edges to the floor and ceiling portions 79 and 80 respectively. The wall sections 76 and 78 are disposed in outwardly converging relation and their outer edges are joined to the middle section 77 as shown particularly in FIG. 8 and this middle section 77 is provided with a door opening 81 in which is hung a door 82, on suitable hinge mountings 83.

The vestibule unit 75 is hingedly mounted at one side upon a frame structure outlining the opening 74, which frame structure is designated 84. The hinge mounting for the vestibule unit is designated 85 and may comprise a continuous or piano type hinge or it may consist of two or more individual hinges and in the illustration here given the hinges are attached to the inner edge of the section 76 of the vestibule unit and upon the inner side of the frame 84 so that the vestibule unit may be swung inwardly to an inoperative position or a position of non-use as shown in FIG. 9.

When the vestibule is swung inwardly in the manner shown, to facilitate transportation of the garage structure, particularly where the structure may have to be towed through narrow streets or areas in which there is not too much room, then the door opening may be covered or closed by a suitable panel 85 as shown in FIG. 9, the panel being secured in place by screws or bolts or other suitable means, not shown.

To provide for an effective seal between the edges of the vestibule structure and the door frame 84, sealing strips of suitable material may be applied either to the inner face of the frame or may be applied to the edges of the vestibule structure as indicated at 86.

In addition to pivotally mounting the vestibule unit on side hinges, a mounting such as that shown in FIG. 3 may be provided wherein the door frame, here designated 84a, is provided with suitable top and bottom center pivots 85a which will engage in suitable bearing openings or sockets, not illustrated, in the vestibule unit at the centers of the inner edges of the floor and ceiling portions 79 and 80. Thus, the vestibule unit may be completely reversed from an operative to an inoperative position or vice versa instead of swinging through an arc into the interior of the garage structure to be positioned as illustrated in FIG. 9.

The numeral 87 designates a window in the wall 16 of the structure, which window may be glazed or of louvered form and such windows may be provided in the other walls if desired.

FIGS. 8, 10 and 11 illustrate another wheel supporting means for the rear of the garage structure and also illustrate flooring construction for the interior of the garage. In these figures there are shown a number of transverse beams or joists 88 extending across the interior of the garage structure and secured at their ends to the flanged sill portions 20 by bolts 89. The numeral 90 generally designates conventional leaf springs, two of which are here illustrated and which springs are attached by conventional brackets or shackles 91 to a pair of floor joists 88 adjacent to the rear of the garage structure. Extending transversely of the structure between the springs 90 is an axle 92, which is attached to the springs in a conventional manner as indicated at 93 and which supports the pneumatic tired wheels 94 upon its ends.

The joists 88 have disposed thereon the flooring 95 and as the wheels 94 are positioned within the area between the side walls 14 and 16 of the garage structure suitable clearance openings 96 may be provided in the flooring for the top portions of the wheels and while no covering is here illustrated, it will be readily apparent that the flooring may carry a suitable housing over the openings 96 to prevent the projection of mud and dirt into the garage structure when the same is being moved over a roadway.

The spring shackles 91 are joined to their respective joists by bolts 97 in a manner to facilitate the quick detachment of the supporting wheels when it may be desired to lower the garage structure onto the ground. Where it may be desirable to use the floored garage structure for transporting another motor vehicle use may be made of ramps 98 for running the vehicle to be transported into the garage structure and onto the floor 95 and to facilitate the attachment of the ramps to the rear end of the structure the rearmost joists 88 may be provided with suitable slots or openings 99 into which the hooks 100 carried by the ramps can be engaged as illustrated in FIG. 10.

As will be readily understood the garage structure here illustrated and described may be readily coupled to a towing vehicle by means of the hitch unit 34, being supported at its rear end upon the wheel units 50 or the wheels 94 and also it will be obvious that when the hitch 34 is connected to the towing vehicle the caster wheel 40 will be elevated from the ground as is conventional in the towing of structures of this type.

When the garage structure has been transported to a location where it is to be used as a housing for the towing vehicle or where it may be used as living quarters, the jacks adjacent to the wheel units 50 or to the wheels 94 may be used to sufficiently elevate the housing structure to facilitate the removal of the wheels or the running gear after which, upon reversing the operation of the jacks at the rear of the housing structure and also the jack 38 at the front end thereof, the structure may be lowered to rest upon the ground.

If the towing vehicle is to be housed in the garage structure, then the vestibule unit may be swung outwardly to operative position as it is illustrated in FIGS. 1, 4 and 8 and it will provide ample space to permit the occupant of the vehicle to open the vehicle door after the vehicle has been placed in the garage. If, however, the garage structure is to be used as living quarters, then it will be seen that the vestibule structure will provide some additional living space and also provides a novel entrance and exit means so that the sliding door structure at the rear of the garage structure may be kept closed.

As hereinbefore stated, when the garage structure is to be moved then the vestibule unit can be swung inwardly to an out of the way position as shown in FIG. 9, or it may be completely reversed by the center pivot means shown in FIG. 3 so that it will project into the interior of the structure instead of projecting outwardly from the adjacent side wall.

From the foregoing it will be seen that there is provided by the present invention a new and novel mobile structure adaptable for use as a garage, as a means for transporting a motor vehicle or as a trailer structure for use as living quarters.

I claim:

1. A mobile housing structure for use as a garage, living quarters, and other purposes, said structure comprising in combination at least front, side and rear walls and a roof, removable rear end running gear, means whereby said rear end may be lowered to the ground following removal of the running gear, combined hitch and jack means attached to the front of the structure for coupling the structure to a draft vehicle and for raising and lowering the structure, one of said side walls having an opening therein, an entrance vestibule forming unit, means supporting said unit in said opening in a position to extend beyond the outer side of the adjacent wall and to be entered from within the housing structure, said unit having a wall portion provided with a door, means supporting said unit for movement to an inoperative position wherein it is disposed within the interior of the housing structure, said removable rear end running gear comprising two independent wheel units each embodying a wheel, a body having the wheel rotatably mounted thereon, means pivotally coupling the body to the adjacent side wall of the housing structure for vertical swinging movement about a horizontal axis, and spring means between the wheel supporting body and the adjacent housing wall.

2. Apparatus as defined in claim 1, wherein the wheel supporting body comprises a housing having side plates and the means pivotally supporting the body comprises a shaft extending transversely through said side plates and secured at one end to the said adjacent side wall of the housing structure.

3. Apparatus as defined in claim 1, wherein said means whereby said rear end may be lowered to the ground following removal of the running gear comprises jack means upon each side of the housing structure adjacent to said running gear.

References Cited in the file of this patent

UNITED STATES PATENTS

| | | |
|---|---|---|
| 748,637 | McDonald | Jan. 5, 1904 |
| 1,729,825 | Gaiser | Oct. 1, 1929 |
| 2,384,659 | Wait | Sept. 11, 1945 |
| 2,648,546 | Falkenhagen | Aug. 11, 1953 |
| 2,751,234 | Couse | June 19, 1956 |
| 2,920,920 | Couse et al. | Jan. 12, 1960 |

FOREIGN PATENTS

| | | |
|---|---|---|
| 1,210,322 | France | Sept. 18, 1958 |